US008078557B1

(12) United States Patent
Ershov

(10) Patent No.: US 8,078,557 B1
(45) Date of Patent: *Dec. 13, 2011

(54) USE OF NEURAL NETWORKS FOR KEYWORD GENERATION

(75) Inventor: Alexander V. Ershov, Sergiev Posad (RU)

(73) Assignee: Dranias Development LLC, Wilmington, DE (US)

( * ) Notice: Subject to any disclaimer, the term of this patent is extended or adjusted under 35 U.S.C. 154(b) by 40 days.

This patent is subject to a terminal disclaimer.

(21) Appl. No.: 12/472,204

(22) Filed: May 26, 2009

Related U.S. Application Data

(63) Continuation of application No. 11/535,559, filed on Sep. 27, 2006, now Pat. No. 7,546,280, which is a continuation-in-part of application No. 11/468,692, filed on Aug. 30, 2006, now Pat. No. 7,475,072.

(60) Provisional application No. 60/722,412, filed on Oct. 3, 2005, provisional application No. 60/719,975, filed on Sep. 26, 2005, provisional application No. 60/735,858, filed on Nov. 14, 2005.

(51) Int. Cl.
G06E 1/00 (2006.01)
(52) U.S. Cl. ...................... 706/19; 706/20; 707/999.006
(58) Field of Classification Search ................... 706/19, 706/20; 707/999.006
See application file for complete search history.

(56) References Cited

U.S. PATENT DOCUMENTS

| 5,086,479 | A | 2/1992 | Takenaga et al. |
|---|---|---|---|
| 5,535,303 | A | 7/1996 | Ekchian et al. |
| 5,546,503 | A | 8/1996 | Abe et al. |
| 5,548,683 | A | 8/1996 | Engel et al. |
| 5,794,178 | A | 8/1998 | Caid et al. |
| 5,819,245 | A | 10/1998 | Peterson et al. |
| 5,937,084 | A | 8/1999 | Crabtree et al. |
| 5,963,965 | A | 10/1999 | Vogel |
| 5,966,126 | A | 10/1999 | Szabo |
| 6,076,051 | A | 6/2000 | Messerly et al. |
| 6,112,203 | A | 8/2000 | Bharat et al. |
| 6,167,398 | A | 12/2000 | Wyard et al. |
| 6,304,864 | B1 | 10/2001 | Liddy et al. |

(Continued)

OTHER PUBLICATIONS

"Inhibitory connections in the assembly neural network for texture segmentation", A. Goltsev, Donald C. Wunsch, Neural Networks, vol. 11, No. 5, Jul. 1998, pp. 951-962.

(Continued)

*Primary Examiner* — Jeffrey A Gaffin
*Assistant Examiner* — Mai T Tran

(57) ABSTRACT

A system for identifying keywords in search results includes a plurality of neurons connected as a neural network, the neurons being associated with words and documents. An activity regulator regulates a minimum and/or maximum number of neurons of the neural network that are excited at any given time. Means for displaying the neurons to a user and identifying the neurons that correspond to keywords can be provided. Means for changing positions of the neurons relative to each other based on input from the user can be provided. The change in position of one neuron changes the keywords. The input from the user can be dragging a neuron on a display device, or changing a relevance of two neurons relative to each other. The neural network can be excited by a query that comprises words selected by a user. The neural network can be a bidirectional network. The user can inhibit neurons of the neural network by indicating irrelevance of a document. The neural network can be excited by a query that identifies a document considered relevant by a user. The neural network can also include neurons that represent groups of words. The neural network can be excited by a query that identifies a plurality of documents considered relevant by a user, and can output keywords associated with the plurality of documents.

23 Claims, 5 Drawing Sheets

U.S. PATENT DOCUMENTS

| | | |
|---|---|---|
| 6,463,423 B1 | 10/2002 | Wada |
| 6,574,632 B2 | 6/2003 | Fox et al. |
| 6,615,197 B1 | 9/2003 | Chai |
| 6,633,868 B1 | 10/2003 | Min et al. |
| 6,640,302 B1 | 10/2003 | Subramaniam et al. |
| 6,725,217 B2 | 4/2004 | Chow et al. |
| 6,931,604 B2 | 8/2005 | Lane |
| 6,938,034 B1 | 8/2005 | Kraft et al. |
| 6,999,959 B1 | 2/2006 | Lawrence et al. |
| 7,181,438 B1 | 2/2007 | Szabo |
| 7,296,009 B1 | 11/2007 | Jiang et al. |
| 7,536,316 B2 | 5/2009 | Ozer et al. |
| 7,584,175 B2 | 9/2009 | Patterson |
| 7,610,195 B2 | 10/2009 | Ojanpera |
| 7,778,946 B2 | 8/2010 | Hercus |
| 2002/0042741 A1 | 4/2002 | Wilson et al. |
| 2002/0042750 A1 | 4/2002 | Morrison |
| 2002/0154167 A1 | 10/2002 | Parsons et al. |
| 2002/0156702 A1 | 10/2002 | Kane |
| 2002/0174101 A1 | 11/2002 | Fernley et al. |
| 2003/0069873 A1 | 4/2003 | Fox et al. |
| 2003/0212663 A1 | 11/2003 | Leno et al. |
| 2003/0216919 A1 | 11/2003 | Roushar |
| 2004/0015408 A1 | 1/2004 | Rauen et al. |
| 2004/0078268 A1 | 4/2004 | Sprogis |
| 2004/0083206 A1 | 4/2004 | Wu et al. |
| 2004/0111319 A1 | 6/2004 | Matsumoto et al. |
| 2004/0172378 A1 | 9/2004 | Shanahan et al. |
| 2004/0181547 A1 | 9/2004 | Mazzagatti |
| 2004/0225722 A1 | 11/2004 | Jeong |
| 2005/0080776 A1 | 4/2005 | Colledge et al. |
| 2005/0086186 A1 | 4/2005 | Sullivan et al. |
| 2005/0132305 A1 | 6/2005 | Guichard et al. |
| 2005/0144158 A1 | 6/2005 | Capper et al. |
| 2005/0165747 A1 | 7/2005 | Bargeron et al. |
| 2005/0165766 A1 | 7/2005 | Szabo |
| 2005/0246296 A1 | 11/2005 | Wei-Ying et al. |
| 2005/0278443 A1 | 12/2005 | Winner et al. |
| 2006/0085395 A1 | 4/2006 | Cradick et al. |
| 2006/0106793 A1 | 5/2006 | Liang |
| 2006/0149721 A1 | 7/2006 | Langford |
| 2006/0190285 A1 | 8/2006 | Harris et al. |
| 2006/0190812 A1 | 8/2006 | Ellenby et al. |
| 2006/0200445 A1 | 9/2006 | Chen et al. |
| 2006/0200461 A1 | 9/2006 | Lucas et al. |
| 2006/0218522 A1 | 9/2006 | Hanechak |
| 2006/0265417 A1 | 11/2006 | Amato et al. |
| 2006/0287919 A1 | 12/2006 | Rubens et al. |
| 2006/0287985 A1 | 12/2006 | Castro et al. |
| 2006/0288023 A1 | 12/2006 | Szabo |
| 2006/0294094 A1 | 12/2006 | King et al. |
| 2007/0009151 A1 | 1/2007 | Pittman et al. |
| 2007/0011150 A1 | 1/2007 | Frank |
| 2007/0022068 A1 | 1/2007 | Linsker |
| 2007/0073580 A1 | 3/2007 | Perry et al. |
| 2007/0073591 A1 | 3/2007 | Perry et al. |
| 2007/0156677 A1 | 7/2007 | Szabo |
| 2007/0192164 A1 | 8/2007 | Nong et al. |
| 2007/0192306 A1 | 8/2007 | Papakonstantinou et al. |
| 2007/0198951 A1 | 8/2007 | Frank |
| 2007/0204238 A1 | 8/2007 | Hua et al. |
| 2007/0214415 A1 | 9/2007 | Williams |
| 2007/0219940 A1 | 9/2007 | Mueller et al. |
| 2007/0239541 A1 | 10/2007 | Kane et al. |
| 2007/0255671 A1 | 11/2007 | Fox et al. |
| 2007/0294641 A1 | 12/2007 | Rashkovskiy |
| 2008/0046406 A1 | 2/2008 | Seide et al. |
| 2008/0052638 A1 | 2/2008 | Frank et al. |

OTHER PUBLICATIONS

"Structure of Neural Assembly" by E. M. Kussul, T. N. Baidyk, Neuroinformatics and Neurocomputers, 1992, RNNS/IEEE Symposium on, Oct. 7-10, 1992, vol. 1, pp. 423-434.

"An assembly neural network for texture segmentation", A. Goltsev, Neural Networks, vol. 9, No. 4, Jun. 1996, pp. 643-653.

Bloehdorn et al., "Semantic Annotation of Images and Videos for Multimedia Analysis", ESWC 2005, 15 pages.

Bonnyman et al. "A Neural Network Application for the Analysis and Synthesis of Multilingual Speech", Apr. 13-16, 1994, ISSIPNN, pp. 327-330.

Brause et al. "Transform Coding by Lateral Inhibited Neural Nets", Proc. IEEE TAI, 1993, pp. 14-21.

Dürsteler, Juan C., InfoVis, http://www.infovis.net/printMag.php?num=97&lang=2, KartOO, Aug. 19, 2002, 2 pages.

Merkl "Text classification with self-organizing maps: Some lessons learned", Neurocomputing 21 (1998) pp. 61-77.

Nejad, A & Gedeon, T. "Bidirectional Neural Networks and Class Prototypes", IEEE Conf. Neural Networks, 1995, pp. 1322-1327.

Paralic et al. "Text Mining for Documents Annotation and Ontology Support", http://people.tuke.sk/jan.paralic/papers/BookChapter.pdf, A Book Chapter in Intelligent Systems in the Service of Mankind, Nov. 2003, 11 pages.

Yusoff "Artificial Neural Networks (ANN) and Its Application in Engineering", http://ppt.ump.edu.my/images/mech/ANN.pdf, Jul. 12, 2005, 6 pages.

Non-Final Office Action on U.S. Appl. No. 12/327,422, mailed May 9, 2011.

Benford et al., Three Dimensional Visualization of the World Wide Web, Dec. 1999, ACM Computing Surveys, pp. 1-16.

Final Office Action on U.S. Appl. No. 12/234,751, mailed Sep. 6, 2011.

Final Office Action on U.S. Appl. No. 12/416210, mailed Sep. 19, 2011.

USE OF NEURAL NETWORKS FOR KEYWORD GENERATION

CROSS-REFERENCE TO RELATED APPLICATIONS

This application is a continuation of U.S. patent application Ser. No. 11/535,559, filed on Sep. 27, 2006, entitled USE OF NEURAL NETWORKS FOR KEYWORD GENERATION, which is a continuation-in-part of U.S. patent application Ser. No. 11/468,692, filed on Aug. 30, 2006, entitled CONTEXT-BASED SEARCH VISUALIZATION AND CONTEXT MANAGEMENT USING NEURAL NETWORKS, which is a non-provisional of U.S. Provisional Patent Application No. 60/719,975, filed on Sep. 26, 2005, entitled CONTEXT-BASED SEARCH VISUALIZATION USING NEURAL NETWORKS, and is a non-provisional of U.S. Provisional Patent Application No. 60/735,858, filed on Nov. 14, 2005, entitled ONE-CLICK SEARCHING SYSTEM AND METHOD, which are both incorporated by reference herein in their entirety.

U.S. patent application Ser. No. 11/535,559, filed on Sep. 27, 2006, is also a non-provisional of U.S. Provisional Patent Application No. 60/722,412, filed on Oct. 3, 2005, entitled USE OF NEURAL NETWORKS FOR KEYWORD GENERATION, which is incorporated by reference herein in its entirety.

BACKGROUND OF THE INVENTION

1. Field of the Invention

The present invention relates to generation of keywords for document digesting, and, more particularly, to keyword generation for search engine output as a means for assisting the user in selecting relevant documents and search results.

2. Description of the Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested.

Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web pages. Web pages that contain the user's search terms are "hits" and are returned to the user.

In an attempt to increase the relevancy and quality of the web pages returned to the user, a search engine may attempt to sort the list of hits so that the most relevant and/or highest quality pages are at the top of the list of hits returned to the user. For example, the search engine may assign a rank or score to each hit, where the score is designed to correspond to the relevance or importance of the web page. Determining appropriate scores can be a difficult task. For one thing, the importance of a web page to the user is inherently subjective and depends on the user's interests, knowledge, and attitudes. There is, however, much that can be determined objectively about the relative importance of a web page. Conventional methods of determining relevance are based on the contents of the web page. More advanced techniques determine the importance of a web page based on more than the content of the web page.

The overriding goal of a search engine is to return the most desirable set of links for any particular search query. Keyword generation is one of the aspects of providing search results and managing the search process. Keywords identify what the documents are "about"—they may be words that are mentioned in the documents themselves, or they may be concepts that are related to the meaning of the document, and which capture, in one or a handful of words, the meaning of the document. Accordingly, there is a need in the art for an effective and efficient system and method for identifying keywords relating to context-based searching.

SUMMARY OF THE INVENTION

Accordingly, the present invention is related to use of neural networks for keyword generation that substantially obviates one or more of the disadvantages of the related art.

In one aspect, there is provided a system for identifying keywords in search results including a plurality of neurons connected as a neural network, the neurons being associated with words and documents. An activity regulator regulates a minimum and/or maximum number of neurons of the neural network that are excited at any given time. Means for displaying the neurons to a user and identifying the neurons that correspond to keywords can be provided. Means for changing positions of the neurons relative to each other based on input from the user can be provided. The change in position of one neuron changes the keywords. The input from the user can be dragging a neuron on a display device, or changing a relevance of two neurons relative to each other. The neural network can be excited by a query that comprises words selected by a user. The neural network can be a bidirectional network. The user can inhibit neurons of the neural network by indicating irrelevance of a document. The neural network can be excited by a query that identifies a document considered relevant by a user. The neural network can also include neurons that represent groups of words. The neural network can be excited by a query that identifies a plurality of documents considered relevant by a user, and can output keywords associated with the plurality of documents.

In another aspect, a system, method and computer program product for identifying keywords, include a plurality of neurons arranged into a neural network comprising a plurality of layers, the layers including words, objects and documents. A plurality of connections connect the neurons, such that each neuron is connected to only some of the other neurons. In response to an input query, the neural network outputs keywords associated with documents that are relevant to the input query.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
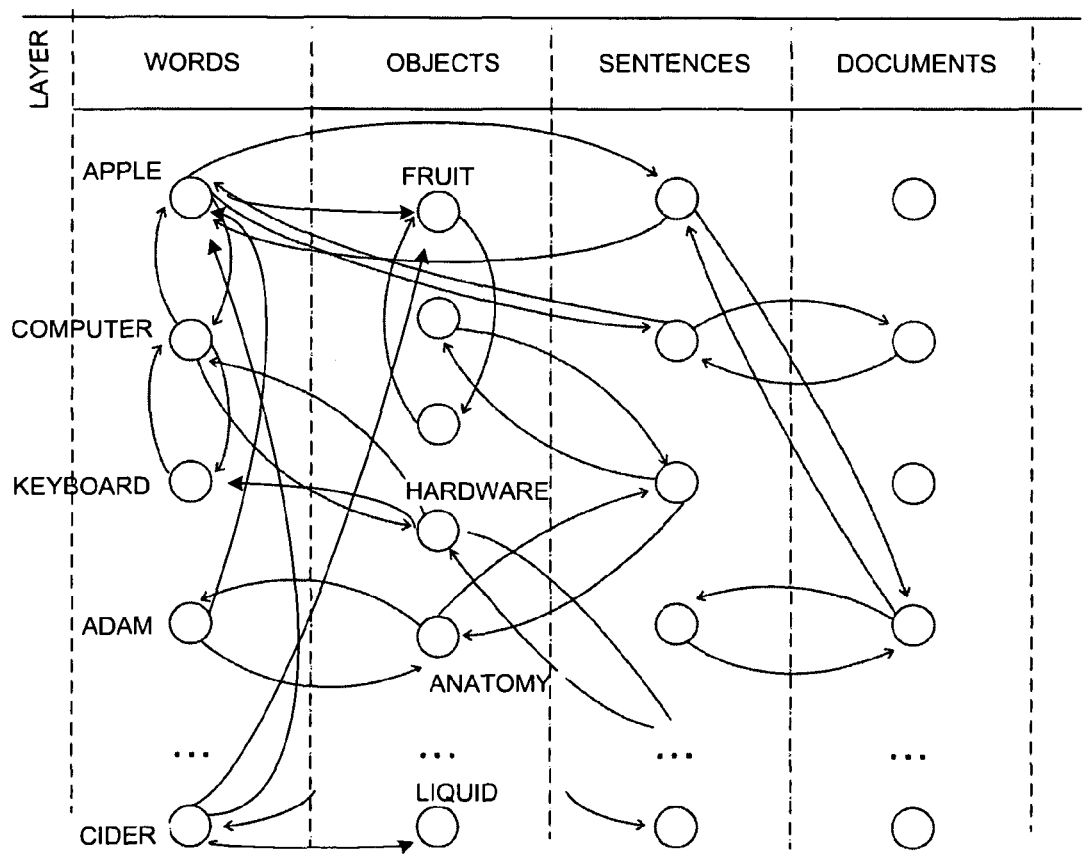
FIG. 1 shows a neural network according to one embodiment of the present invention.

Reference will now be made in detail to the embodiments of the present invention, examples of which are illustrated in the accompanying drawings.

Currently, the most widely known implementation of neural networks is referred to as a "back propagation neural network." This is a multi-layer neural network, where each layer typically consists of a set of neurons, and between each element of each layer there has a connection to every element of a next (or higher) layer. One of the most difficult problems in the field of neural networks is therefore the question of teaching the neural network, which, in mathematical terms, is translated to forming the coefficients of the connections between the neurons. Back propagation networks usually use a multi-cycle approach to gradually reduce the errors in the network, in other words, to gradually change the value of the coefficient of the connections. Note that the user needs to specify both the inputs and the desired outputs of the back propagation neural network. Well-known problems of this approach are a significant investment of time by the user into the learning process, as well as the fact that the "right" result is not guaranteed in a finite number of cycles.

Some of the practical barriers to implementing neural networks in the search field include the difficulty of selection of the proper topology of the network—in other words, identifying what should be the proper inputs, the proper outputs, and how to arrive at the "correct" set of coefficients for the connections between the neurons. Another problem involves the learning process itself—the mechanism of changing the coefficients of the connections needs to be identified, such that it is guaranteed, in some sense, to ultimately arrive at the right result in a finite number of cycles. Furthermore, any practical implementation of such a neural network for the search application needs to contend with a very large number of elements and connections. This, in turn, places a very heavy demand on the computational hardware involved, and, as a practical matter, is today not realizable.

Furthermore, there are a number of difficulties of an algorithmic nature. For example, a typical problem when using neural networks for text searching is over-excitation of the network. Therefore, some algorithm needs to be devised to damp down, or inhibit, the excitation, otherwise, at some point in time, the entire neural network will be excited, or activated, producing a meaningless result.

The approach proposed herein uses neural networks with a certain topology that permits efficient and effective searching of documents. This approach also permits searching of documents that takes into account the context of the keywords and the "meaning" of the words, sentences, clusters of words, documents, and so forth. The approach described herein uses a set of neurons that are not connected to all other neurons on the same layer (or all other neurons on some other layer), but only to a subset of such neurons, and usually to a number of neurons that is dramatically less than the total number of neurons in the network.

A basic element of a neural network is, as noted above, a neuron, which has a header, and a set of connections to other neurons. The header includes all the information necessary for the functioning of the neuron. The set of connections is essentially a set of identifiers (for example, numbers) of the neurons with which this particular neuron is connected, and the magnitude (weight) of the connection. Such weight can range from −1 to +1 (or some other number, here, −1 to +1 can be viewed as a normalized value). A negative value for the weight of the coefficient represents an inhibition, or damping, of the excitation, a positive number represents an increase in the excitation. A zero may be viewed as a lack of connection between two neurons, meaning that they are never found in the same context.

This organization permits generation of a neural network of an arbitrarily large size, but at the same time permits very rapid feed forward and back propagation of information within the neural network.

Preferably, at the output, the value can range between +1 and −1 (these numbers can also be viewed as normalized values). Most commonly, output values in the range of zero to +1 are used to identify relevant documents (typically, this represents documents or concepts that have at least some relevance to the user's query, whereas documents corresponding to negative values of the output typically represent those that are specifically identified as being the "opposite" in some sense of what the user is looking for).

To calculate the activity within the network, two intermediate values are used—excitation activity, and inhibition activity. These values correspond to the excited/inhibited neurons in the network. Recalculation of the activity is done as follows:

For each neuron whose excitation value is non-zero, and for each connection of such neuron, that neuron transmits its own "level of activity" (excitation or inhibition) through its connections to those neurons to which it is connected, as described generally in U.S. patent Ser. No. 11/468,048, filed Aug. 29, 2006, entitled NEURAL NETWORK FOR ELECTRONIC SEARCH APPLICATIONS, which is incorporated herein by reference in its entirety.

Furthermore, an excited neuron can transmit an inhibiting value to the next level, if this neuron is related to concepts on that level that the user specifically wants to exclude. Furthermore, to improve the performance of the system, and to improve the ability to define context for document searching, a set of active neurons is used. This set contains the identifiers of the neurons that can be excited at any given moment in time. Depending on the mode of operation, neurons can be added to this set, or not. Note furthermore that the neural network functions in a discrete manner—in other words, a change in the activity level of the neural network can occur only on a "clock cycle." This network organization allows efficient searching through documents, such as, for example, text documents.

To effectively manage searching using neural networks, a necessary step is the conversion of text into various elements of the neural network. In a preferred embodiment, the network (at least conceptually, though implementations may vary) includes several layers, see FIG. 1. The first layer is the word layer—here, each neuron corresponds to one word from a dictionary. For example, the word "apple," on the first (word) layer (which has at least three meanings—Apple Computer, apple the fruit, and Adam's apple) has a single neuron.

An object layer (which is not, strictly speaking, necessary, but helps with performance issues) has neurons that correspond to identified objects and their properties. Here, the word "apple" of layer 1 corresponds to three neurons in layer 2—a neuron associated with the "object" Apple Computer, a neuron associated with the object apple (the fruit), and a neuron that refers to the object "Adam's apple." This layer also can have word combinations as neurons.

Layer 2 is also optional, and so is the sentence layer (layer 3). In this layer, each neuron corresponds to a sentence in a document.

The fourth layer is a document layer, where each neuron in this layer corresponds to an indexed document. This layer is also optional, and, in fact, it is possible to have only a single layer in the network, with the appropriate connections between the neurons. However, conceptually, it is easier to visualize the topology of the neural network in the form of multiple layers. Furthermore, the division into layers is to some extent arbitrary, since some word combinations can be put into layer 2 or layer 3, depending on the situation. In many cases, two layers, a word layer and a document layer, are sufficient for effectively searching through the document. The connections can be formed in either direction (forward and back), and excitation/inhibition can propagate both forward (from layer 1 to layers 2, 3 and 4, from layer 2 to layers 3 and 4, etc.) and back (from layer 4 to layers 3, 2, 1, from layer 3 to layers 2 and 1, etc.). Furthermore, it will be appreciated that the network can be implemented (in minimal form) using either the word layer (layer 1) and the document layer (layer 4), or using the word layer (layer 1) and the sentence layer (layer 3), since the documents can be reconstructed from the sentence layer. The network is a bidirectional network, since connections can be directed from layer 1 to 2, 3, 4, from layer 2 to 3, 4, etc., as well as from layer 4 to layer 1, 2, 3, from layer 3 to layer 1, 2, etc.

In one embodiment, the neural network is formed as follows:

(1) Convert document to plain text, to remove formatting artifacts.

(2) Parsing—the text of a document needs to be converted to a structure: paragraph/sentences/word index. At this stage, the text is replaced. In other words, words are replaced with indices (numbers of the words in the index). For example, the text "we welcome participants in this competition" can be replaced by "246 354 86543 348 275 19". Parsing can also include a morphological aspect, in other words, various morphological variations of the same word (America, American, Americans, americanize) can have the same index value (or, in the absence of morphological analysis, different indices).

(3) Filtering—words that have no significant meaning, articles, prepositions, etc. can be removed.

(4) Based on stable word combinations, and based on statistical analysis of frequency of the words, a dictionary of word combinations can be formed. Thus, indices of single words can be replaced by a single index of the word combination. For example, the word combination "airline safety" could be represented by as "2567 37942", and after identifying the word combination, as only a single neuron with an index (e.g.) "29974".

(5) The word layer of the neural network is then formed—i.e., based on the words and the word combinations identified previously, a necessary number of neurons is created, and each such neuron is associated with a word or word combination. For example, if a document has 1000 words and word combinations, then the word layer of the neural network will have 1000 elements. As the neural network continues to learn, additional neurons can be added to the word layer, as the new words are encountered.

(6) In one embodiment, the connections between the neurons of the neural network are then formed, for example, based on the formula $W_{ij}=W_{ij}+F(L_{ij})$, where $W_{ij}$ is the connection between neuron i and neuron j, and $F(L_{ij})$ is the function of the "distance" between neurons i and j. In other words, the more frequently the closer the two words occur in the text, and the more common such occurrences, the larger the value of the function $F(L_{ij})$. Also, a connection formed in one document, but not found in any others should have its weight reduced, since such a connection is likely not a "real" connection. This will have a corresponding decrease in the weights of the connections of other neurons related to this neuron/connection. Similarly, an increase in the excitation of one neuron will lead to an increase in the weights of the connections of other neurons that are related to this neuron/connection. Alternatively, when one connection's weight is increased, the weights of other connections of that neuron are decreased (and vice versa).

(7) Other layers are then formed, for example, the object layer, the sentence layer, and the document layer, and the connections between these layers and the word layer are identified. This can be done based on the equation $W_{ij}=f(N_i)$, where $W_{ij}$ is the connection between the word i and the sentence j; and $f(N_i)$ is the function of the frequency of occurrence of the word i in the sentence j. Similarly, the frequency of occurrence of the sentences in the documents (if there are multiple documents) can be used to establish the values of the coefficients W (i.e., the weight of the connections) between the relevant neurons.

The parsing process can also generate dynamic models, which identifies not just words in the text, but their meaning and more complex concepts associated with them. For example, a sentence "As a result of the parliamentary elections, the winner was . . . " can result in connections between this sentence and neurons that represent the words "electorate," "campaign," "race," "party platform," etc. In other words, the connections can be established not just between words, but also between concepts that are themselves not mentioned in the given sentence.

The source of information for the neural network can be text (or other types of documents) of various formats, databases, specialized information systems (for example, magazines, articles, publications dedicated to a particular field of endeavor, etc.), documents management and document exchange systems, etc. To extract text from these sources, various format converters can be used, for example, converting MS Word, pdf, rtf, and other types of formats to text so that the text can then be parsed, as discussed above. Various filters can be used to extract words and morphological variations, which can be particularly useful to reduce the overall number of neurons in the network.

Initially, the neural network does not contain meaningful elements, but is only defined by the number of layers used. During the indexing process, each new word is added to the word layer of the neural network. Also, at the time that the new word is added, at least some (though not necessarily all) connections between that new word, and the other neurons of the word layer and the neurons of other layers, can be identified. When the same new word is encountered again, the weights of the corresponding connections, which represent how "close" the words are contextually, can be updated. For example, the weight of the connections increases if the relationship between new word i and word j reoccurs in the document.

At the same time, objects can be identified from such multiple connections between the neurons of the word layer and the neurons of the object layer. Also, as additional documents are indexed, sentence neurons can be added to the sentence layer, with the connections to the word and the object layer neurons. Similarly, the document layer is updated. Thus, the structure as shown in FIG. 1 is generated, which functions as described in U.S. patent application Ser. No. 11/468,048, entitled NEURAL NETWORK FOR ELECTRONIC SEARCH APPLICATIONS, Filed: Aug. 29, 2006, which is incorporated herein by reference in its entirety.

On a somewhat more general level, the question of how to define context within the framework on the neural network (see, for example, discussion in U.S. patent application Ser. No. 11/468,692, filed on Aug. 30, 2006, entitled CONTEXT-BASED SEARCH VISUALIZATION AND CONTEXT MANAGEMENT USING NEURAL NETWORKS) can be addressed by any of:

(1) Keywords
(2) Fragments of text (e.g., sentences, paragraphs, portions of documents)
(3) Documents Keywords can also be used to define the context of the search. In other words, the question that arises upon encountering a document is: "what is this document about?" In particular, the problem is that what the document is "about" may not necessarily be summarized by a single word that is actually found in the document. For example, consider the case of Boeing Aircraft Co. coming out with a new airliner, the Boeing 787 Dreamliner. The user may be interested in the subject of sales of Boeing aircraft, and how these sales compared to comparable sales of Airbus aircraft. Therefore, the user is looking for documents that are "about" sales of Boeing 787s, only vaguely interested in sales of Airbus A350, and possibly the competition between the two manufacturers.

However, documents that discuss sales of Boeing aircraft might not necessarily mention the word "sale." Other synonymous and partially synonymous words can be used, such as "purchased," "bought," "signed contracts," "signed a letter of understanding," "agreed to add to their fleet" (when talking about an airline), etc. Thus, limiting the search to documents that only discuss "Boeing 787" and "sale" would miss a large number of potentially useful documents that are "about" sales of the Boeing 787. On the other hand, adding all the words that are either synonyms, or closely related to the words "sale" ("signed a letter of intent," "signed a contract," etc.) would expand the number of results (hits) dramatically, and will likely include a very large number of irrelevant documents.

Also, not every relevant document that discusses the sales of the 787 necessarily mentions the number "787" or the word "Dreamliner." A reader, reading about a newly launched Boeing aircraft in the 2005 time frame would presumably "know" that the aircraft at issue is the Boeing 787. Therefore, such a document is also "about" what the user is looking for, even though it might not contain the keywords "787" or "Dreamliner."

The problem, therefore, is how to help the user identify the keywords that are necessary for searching for those documents that are "about" his query, and how to construct a hierarchy of some sort of relevant keywords, where some of the keywords can be considered, in some sense, as being more relevant than others.

Furthermore, the problem of keyword identification also works in the reverse direction. Consider a number of documents, where the user would like to know what the documents are about. In other words, the user starts out with a "clean slate," knowing nothing about the documents except that the documents exist. For a large number of documents, the user therefore would like to know that some of those documents are about X, some are about Y, and some are about Z. Therefore, working from the direction of documents in the direction of keywords, the problem can be framed in the form of identifying what the documents are "about" and selecting the keywords that most closely convey the meaning of the documents, so that documents similar in "meaning" can be found.

Furthermore, in addition to knowing what the documents are "about", the user typically needs to find other documents. These may be documents "very similar to this one," documents that are "like this one," documents that are "not like this one", etc. The important thing is to find not just documents that are similar in the sense of containing quotations of identical material, but similar in meaning.

As one example, the user may be expressly NOT interested in sales of model Boeing 787 airplanes, or sales of toys in the shape of Boeing 787 aircraft. Thus, documents that are "about" sales of toys, even if they mention the Boeing 787, are not relevant to the user, and need to be excluded.

Furthermore, the meaning of the document may be viewed in a narrow context, and in a broad context. For example, an article discussing the sale of ten Boeing aircrafts to a particular airline has a narrow context of just that—the sale of ten aircraft to that particular airline. On the other hand, the broad context of the article may be the aircraft industry in general, the airline industry, international economics, etc. Similarly, a document generally discussing the history of aircraft development, which mentions the Boeing 787 (as one of many items) may be of interest to a user if his search is "broad," but may be of no interest to the user if the user is specifically looking for details of sales of a particular aircraft to particular airlines.

Initially, if no query input is specified, the neural network can be viewed as containing two types of neurons—the "word" neurons, and the "document" neurons, and a set of connections between them. With no query input, asking what the documents are about would generate a set of keywords that is essentially based on the frequency of occurrence of the words in the documents, and a general set of connections between the word neurons. As a query is propagated back and forth through the neural network, the keywords produced by the neural network will change.

The query can be in the form of a group of words, sentences, paragraphs, or documents.

By inputting a query along the lines of "Boeing 787 sale contract," the relative importance of words and concepts associated with these terms will increase, and the relative importance of others, unconnected to these words will decrease. Given a set of documents that are represented by the document layer neurons, those neurons that represent documents that are "like this one," or "related to this one," will be identified to the user (e.g., by their position in a visualization construct, such as described in U.S. patent application Ser. No. 11/468,692, filed on Aug. 30, 2006, entitled CONTEXT-BASED SEARCH VISUALIZATION AND CONTEXT MANAGEMENT USING NEURAL NETWORKS) as being more relevant, and others as less relevant. The user can then indicate using the visualization constructs that some of the found documents (documents about model 787 airplanes, or documents about Boeing 787 toys) are not relevant to the user. Therefore, the neural network, through the mechanism of the neurons transmitting their level of activity along their connections to other neurons, will produce a new set of keywords, based on the fact that those neurons associated with toys and model airplanes will be inhibited.

An important mechanism involved in keyword generation is the Activity Regulator. In essence, the Activity Regulator is designed to maintain the overall activity within the neural network in a certain range. Once the overall activity is higher than a predetermined level, the activity of all the neurons is proportionately decreased. Similarly, if the overall activity is too low, it can be raised.

There are a number of Activity Regulators that can be used. For example, the Activity Regulator can maintain a maximum and minimum number of neurons of the network that are excited (e.g., between 2% and 10% of the total).

Furthermore, an excited neuron can transmit an inhibiting value to the next level, if this neuron is related to concepts on that level that the user specifically wants to exclude. Furthermore, to improve the performance of the system, and to improve the ability to define context for document searching, a set of active neurons is used. This set contains the identifiers of the neurons that can be excited at any given moment in time. Depending on the mode of operation, neurons can be added to this set, or not. Note also that the neural network functions in a discrete manner—in other words, a change in the activity level of the neural network can occur only on a "clock cycle." This network organization allows efficient searching through documents, such as, for example, text documents.

In the case of an under-excited network, i.e., one where virtually no neurons have been sufficiently excited, the Activity Regulator can be used to increase the overall level of activity, in the hope that neurons that are only weakly excited can be stimulated to a point where the network begins to function properly. The Activity Regular can maintain a minimum number of neurons, e.g., 1% of the total, that are excited.

The user, through excitation of some of the neurons that he considers relevant (for example, by indicating graphically, or with a mouse, that this particular neuron (for instance, "signed a contract for purchase") is relevant to the query, and that particular neuron ("model airplane," "toy") is not relevant, can both excite new neurons, and inhibit already excited neurons. This is somewhat similar to searching for documents, the primary difference being that conceptually, the user is focused on the intermediate layer of concepts ("Boeing 787 Dreamliner," "sale," "signing a contract," "purchase," and "agreements to buy aircraft"). The generation of proper keywords is therefore a useful tool for finding documents that are in the proper context (i.e., a related to the "meaning") that the user seeking, rather than merely containing the keywords that the user originally comes up with (which can result in an output from conventional search engines that is both over- and under-inclusive).

Keyword identification can work under a number of conditions:
  (1) the input is null, and the output is the most important words based on frequency analysis of the index;
  (2) the input query contains keywords specified by the user, and the output should show keywords relevant to the context of the input keywords;
  (3) both the input represents both words and documents, and the output should contain keywords, relevant to the context of the documents, further defined by the context of the documents.

Figure 2A:
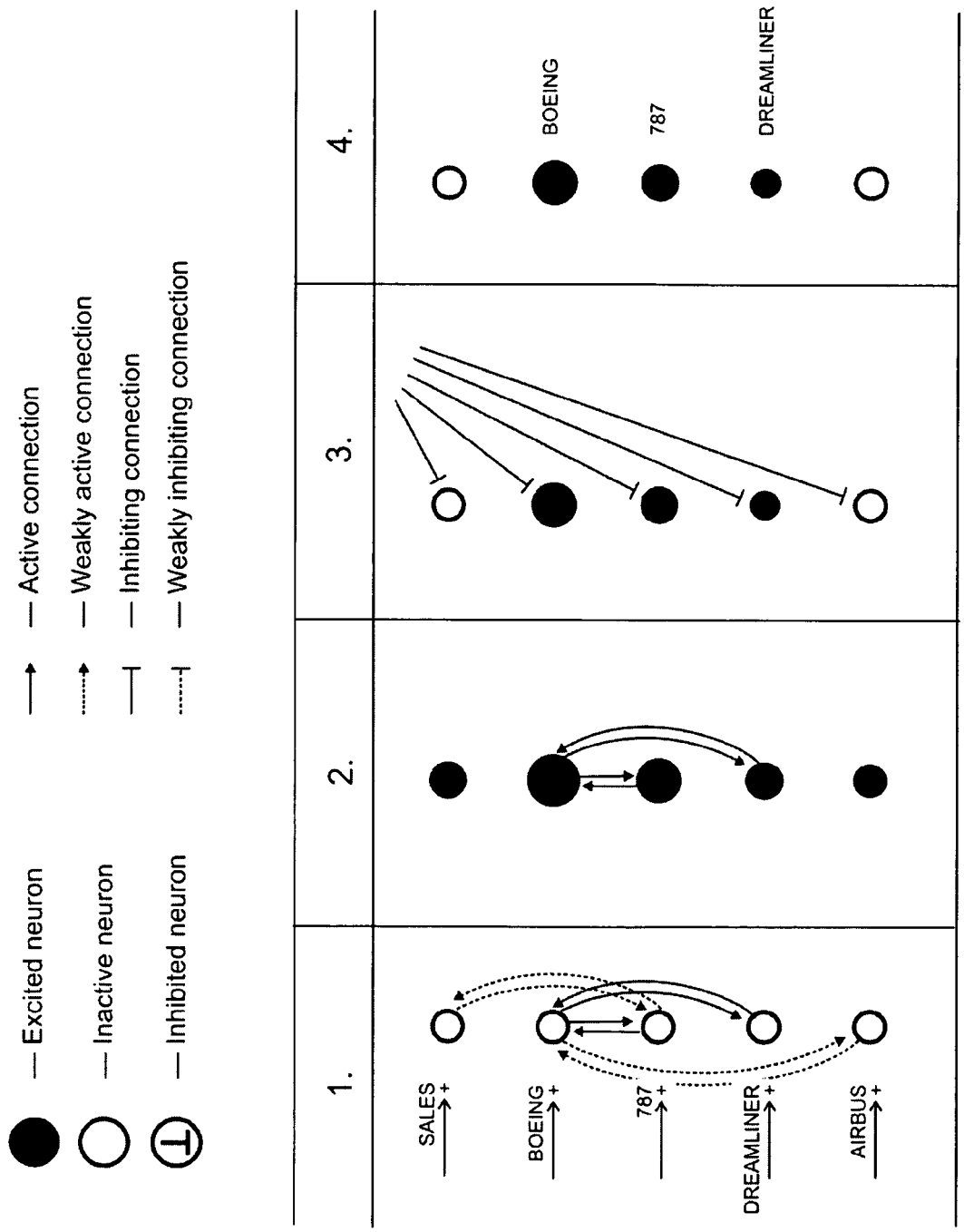
FIGS. 2A-2C illustrate the dynamics of using a neural network, such as illustrated in FIG. 1, to identify keywords.

A number of approaches can be used to utilize the neural network for keyword generation. In the first approach, which is illustrated in FIG. 2A (using the Boeing 787 example):
  (1) the neurons are activated with minimal activity level (e.g., 0.1).
  (2) the overall network activity is recalculated, with the neurons transmitting their activity to other neurons, to which they are connected. As a result, those neurons that have the maximum number of connections will become maximally excited, while neurons with no connections will be only weakly excited.
  (3) the Activity Regulator proportionately decreases the activity of each neuron, such that the total activity of all the neurons is not more than some threshold value (e.g., 50, or some predefined percentage), defined in the settings or defined by the user. Thus, only the most active neurons will remain excited, i.e., neurons with the most number of connections.
  (4) the results—in other words, the chosen keywords—can then be outputted to the user. Note that in these figures, circle size and "blackness" represent the relevance of that neuron.

Figure 2B:
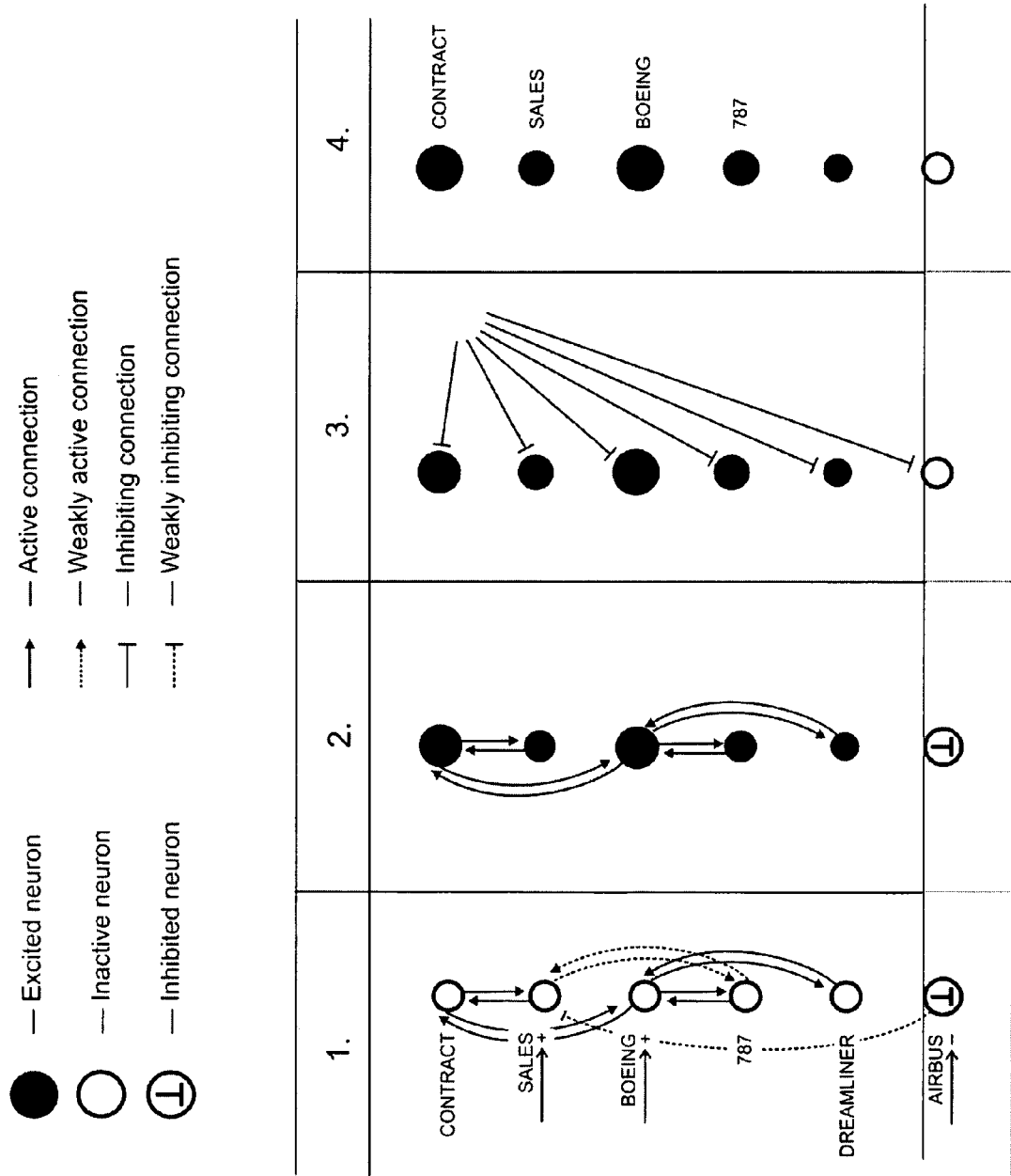

In an alternative approach, illustrated in FIG. 2B,
  (1) the context is defined by maximally exciting those neurons that are closely associated with that context (i.e., those neurons are given particular relevance coefficients by the input query);
  (2) the overall network activity is re-calculated. Neurons that have a positive level of activity (i.e., those words that must be present in the output), through their connections, excite other neurons, while those neurons that have a negative level of activity (i.e., they should NOT be present in the output) inhibit those neurons to which they have connections. As a result, only those neurons that are connected (strongly connected) to the positively active neurons and are also not connected (not strongly connected) to negatively active neurons.
  (3) The Activity Regulator performs its job; and
  (4) the results are outputted.

Figure 2C:
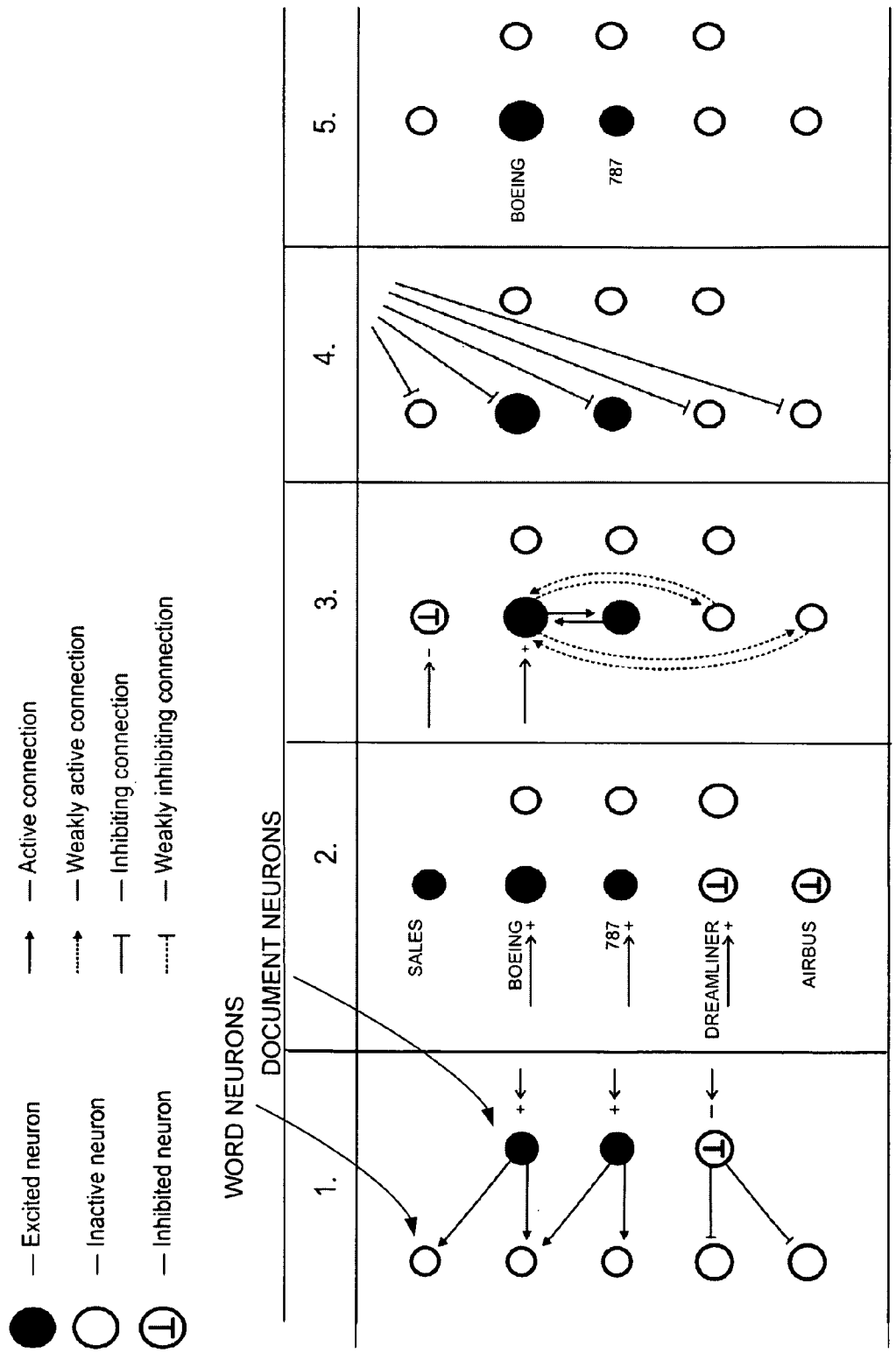

In yet another alternative algorithm, illustrated in FIG. 2C, an additional step of identifying words based on the documents is added:
  (1) the context is defined by the user. Given that when it comes to defining the context, files have a higher priority compared to just words, the process is a two-stage process:
    a) the first stage is defining the context of the documents: the neurons of the document layer are excited and given a value (i.e., the activity is moving right to left in the figure)
    b) the network activity is recalculated. Neurons activated through their connections in turn excite or inhibit other neurons
  (2) thus, the context of the documents is generated—
    a) a set of words is identified, for which it is possible to further define the context with the aid of words;
    b) the second stage involves further specifying the context using words, followed by a process similar to the approach described above;
  (3) The activity is recalculated and renormalized. As a result, the output represents words from the context of the documents which is closest in meaning to the query;
  (4) the Activity Regulator performs the renormalization; and
  (5) the results are outputted.

Additionally, the document neurons in FIGS. 2A-2C can correspond to previously identified documents, or can be produced by an additional search query based on the just-generated keywords. In other words, the process can be iterative, with the user using the results of both the keyword generation process as described above, and also using the keywords to find new documents, which in turn can have their own keywords.

Furthermore, it should be noted that the approach described herein is applicable to any collection of documents, regardless of where they are stored. For example, it is applicable to documents stored on the local hard drive, on a corporate network, or on the internet. Furthermore, the approach is highly scalable, substantially independent of the number of documents involved. In the case of a local hard drive, the documents at issue could be text files, word processing files, email files, attachments to emails, databases, etc.

The following article about the Boeing 707 aircraft at http:**en.wikipedia.org*wiki*Boeing_707 will be used as an example of how keywords can be generated. The text of the article is reproduced as follows:

From Wikipedia, the free encyclopedia

View of the port (left) number 1 & 2 Pratt & Whitney JT3D jet engines of a British Caledonian Boeing 707 showing the peculiarity of the number 1 engine mount which is different from the other three. June 1975. The Boeing 707 was a four engined commercial passenger jet airliner developed by Boeing in the early 1950s. Although it was not the first commercial jet in service (that distinction belongs to the De Havilland Comet), it was the first to be commercially successful[citation needed], and is credited by many as ushering in the Jet Age, as well as being the first of Boeing's 7X7 range of airliners. Boeing delivered 1,010 Boeing 707s.

History

The 707 was based on an aircraft known as the 367-80. The "Dash 80", as it was called within Boeing, took less than two years from project launch in 1952 to rollout on May 14, 1954. The prototype was the basis for both the KC-135 Stratotanker, an air tanker used by the United States Air Force, and the 707. This was powered by the Pratt & Whitney JT3C engine which was the civilian version of the J57 used on the many military aircraft of the day including the F-100, F-101, F-102, and the B-52. A late and costly decision was to widen the fuselage by 6 inches (150 mm) compared to the original 367-80 and KC-135 so as to be a little wider than the Douglas DC-8.

Pan Am was the first airline to operate the 707; the aircraft's first commercial flight was from New York to Paris on Oct. 26, 1958. American Airlines operated the first transcontinental 707 flight on Jan. 25, 1959. The 707 quickly became the most popular jetliner of its time, edging out its main competitor, the Douglas DC-8.

In order to become a new major player in the commercial airliner business, Boeing was quick to bend to customer's desires. While the 707-120 was the initial standard model with Pratt & Whitney JT3C engines, Qantas ordered a shorter body version called the 707-138 and Braniff ordered the higher thrust version with Pratt & Whitney JT4A engines, the 707-220. The final major derivative was the 707-320 which featured an extended span and larger wing. The ultimate version was 707-420, a -320 equipped with Rolls-Royce Conway turbofan engines. Most of the later 707s featured the more fuel efficient and quieter JT3D turbofan engines and flaps on the leading edge of the wings to improve takeoff and landing performance. These were denoted with a "B" suffix such as 707-120B and 707-320B. One peculiarity of the aircraft is the outer port engine mount which is different to the other three.

As the 1960s drew to a close, the exponential growth in air travel led to the 707 being a victim of its own success. It had become obvious that the 707 was now too small to handle the increased passenger densities on the routes for which it was designed. Stretching the fuselage was not a viable option because the installation of larger, more powerful engines would in turn need a larger undercarriage, which was not feasible given the design's limited ground clearance. Boeing's answer to the problem was the first twin aisle airliner—the 747. The 707s first-generation engine technology was also rapidly becoming obsolete in the areas of noise and fuel economy.

The 707, like all swept wing aircraft, displayed an undesirable "Dutch roll" flying characteristic which manifested itself as an alternating yawing and rolling motion. Boeing already had considerable experience with this on the B-47 and B-52, and had first developed the yaw damper system on the B-47 that lent itself to later swept wing configurations including the 707. However many new 707 pilots had no experience with this phenomenon as they were transitioning from straight wing propeller driven aircraft such as the DC-7 and Lockheed Constellation. On one customer training flight, where the yaw damper was turned off to familiarize the new pilots on flying techniques, a trainee pilot exacerbated the Dutch roll motion causing a violent roll motion which tore two of the four engines off the wing. The plane crash landed on a river bed north of Seattle, killing some of the crew.

Production of the passenger 707 ended in 1978. In total, 1,010 707s were built for civil use. The military versions remained in production until 1991.

Traces of the 707 are still in some of Boeing's current products, most notably the 737, which uses a modified version of the 707s fuselage. The Boeing 727 and Boeing 757 used essentially the same fuselage stretched or shrunk to fit the needs of the particular model or subtype. The 737 and 727 also used the same external nose and cockpit configuration as the 707.

Variants

BOAC 707 at London Heathrow Airport in 1964

British Caledonian Boeing 707, registration number G-AXRS shown at Prestwick International Airport, South Ayrshire, Scotland, circa 1972. This aircraft suffered engine separation during cargo flight 1998, no loss of life and was scrapped. 367-80 (Dash-80): The original prototype jet transport layout. Used to develop the 707, it was fitted with four Pratt & Whitney JT3 engines producing 10,000 lbf (44 kN) each. First flight was 15 Jul. 1954.

707-120: 69 of the first production 707s were built, with a longer fuselage and greater wingspan than the original Dash-80. A full set of rectangular cabin windows was included for the interior, which was capable of a maximum seating for 179 passengers. The version was designed for transcontinental routes and often required a refuelling stop when used on the North Atlantic route. It was fitted with four Pratt and Whitney JT3C-6 turbojets, civilian versions of the military J57 model, which produced 12,500 lbf each, allowing a 257,000 lb TOGW. First flight was on 20 Dec. 1954. The most important customer variant was the 707-138 for Qantas ('38' being Qantas' customer number), which had a 10 foot reduction to the rear fuselage and was capable of increased range. 13 of the 707-100s produced were -138 models. Other major orders were the launch order for 20 707-121 aircraft by Pan American and an American Airlines order for 30 707-123 aircraft. Pan Am service began the 707 career on 26 Oct. 1958.

707-220: Designed for hot and high operations with powerful Pratt & Whitney JT4A-3 turbojets, only five of these were ultimately produced. All were for Braniff International Airways and carried the model number 707-227. This version was made redundant by the arrival of the turbofan.

707-320 Intercontinental: A stretched version of the turbojet-powered original model, powered by JT4A-3 turbojets producing 15,800 lbst each. The interior allowed for up to 189 passengers due to a 100 inch stretch, while a longer wing carried more fuel increasing range by 1,600 miles allowing the aircraft to operate as true transoceanic aircraft. Take-off weight was increased to 316,000 lb. First flight was on 11 Jan. 1958 and 69 turbojet -300s were produced.

707-120B: The first major upgrade to the design was a reengining with JT3D-3 turbofans, which were quieter, more powerful, and more fuel efficient, producing 18,000 lbf each. The aircraft also received extra leading edge slats and the tailplane was enlarged. 72 of these were built, and many more were converted from 707-100 aircraft, including Qantas' aircraft, which became 707-138B aircraft upon conversion. The first flight of the -100B was on 22 Jun. 1960.

707-320B: A reengining of the stretch version was undertaken in parallel with the -100B, using the same JT3D-3 turbofans and incorporating many of the same airframe upgrades as well. Take off gross weight was increased to 335,000 lb. 175 of the 707-300B aircraft were produced, as well as upgrades from original -300 models. The US military designation for the cargo version of the 707-320B is C-18. The 707-353B was adopted by the United States Air Force and designated VC-137C for service as a presidential transport. One of the final orders was by the Iranian Government for 14 707-3J9C aircraft capable of VIP transportation, communication, and inflight refuelling tasks.

707-320B Advanced: A minor improvement made available to -300B aircraft, adding the new wing leading edge from the -300C model to earlier -300B versions.

707-320C: A convertible passenger/freight configuration which ultimately became the most widely produced variant of the 707, the -300C added a strengthened floor and a new cargo door to the -300B model. 335 of these variants were built, including a small number with uprated JT3D-7 engines and a takeoff gross weight of 336,000 lb. Despite the convertible option, a number of these were delivered as pure freighters.

707-420: A version of the 707-300C originally produced at specific request for BOAC and powered by Rolls-Royce Conway 50B turbofans, producing 17,500 lbf each. Although BOAC initiated the programme, Lufthansa was the launch customer and Air India was the first to receive a 707-420 on Feb. 18, 1960. A total of 37 were built to this configuration.

707-700: A test aircraft used to study the feasibility of using CFM International's CFM56 powerplants on a 707 airframe and possibly retrofitting them to existing aircraft. After a testing in 1979 N707QT, the last commercial 707 airframe, was refitted to 707-320C configuration and delivered to the Moroccan Air Force as a tanker aircraft. (This purchase was considered a "civilian" order and not a military one.) Boeing abandoned the program, since they felt it would be a threat to the Boeing 757 program. The information gathered in the test led to the eventual retrofitting program of CFM56 engines to the USAF C-135/KC-135R models, and some military versions of the 707 also used the CFM56. Ironically the Douglas DC-8 "Super 70" series by Cammacorp did develop commercially, extending the life of DC-8 airframes in a stricter noise regulatory environment so there are today more DC-8s in commercial service than 707s.

720: Originally designated 707-020 but later changed for marketing reasons, was a modification of the 707-120 designed for medium-range operation from shorter runways. It was lighter and faster than the Boeing 707, and had a simplified wing design. This model had few sales, but was still profitable due to the minimal R&D costs associated with modifying an existing type. At one point in the promotion stage to airlines it was known as the 717, although this model designation remained unused until it was applied to the MD-95 following Boeing's merger with McDonnell Douglas. The 720 was used before the Boeing 727 replaced it in the market. First flight was on 23 Nov. 1959 and 64 of the original version were built.

720B: The turbofan powered version of the 720, with JT3D-1-MC6 turbofans producing 17,000 lbf each. Takeoff gross weight was increased to 235,000 lb. 88 of these were built in addition to conversions of existing 720 models.

Operators

A KC-135 Stratotanker refuels a F-22 Raptor Although 707s are no longer employed by major US airlines, many can still be found in service with smaller non-US airlines, charter services and air cargo operations. Use of 707s on US cargo routes has declined in recent years because the now-obsolescent turbojet engines used on many 707s are far too loud to meet noise restrictions at many US civil airports.

The first two aircraft built to serve as Air Force One were custom-built Boeing 707s, with designation VC-137; these were also used by high-ranking federal officials on official trips. Many other countries use the 707 as a VIP transport, including Argentina, Brazil, Chile, the Republic of Congo, Egypt, Indonesia, Israel, Italy, Jordan, Libya, Morocco, Pakistan (PAF), Romania, Saudi Arabia, Sudan, and Venezuela. The Royal Australian Air Force (RAAF) operated a number of 707s that were specially modified for VIP use before replacing them with modified BBJs. Other military operators of the Boeing 707 have included Angola, Canada, Colombia, Germany, India, Iran, Paraguay, Peru, Portugal, Spain, Taiwan, Togo, United Arab Emirates and Yugoslavia.

The U.S. and other NATO-aligned countries, as well as South Africa and Israel, have used the 707 platform for aerial refueling (KC-135) and AWACS (E-3 Sentry), although many of these aircraft are now being phased out. The Royal Australian Air force (RAAF) operates 707s as refuellers for Australia's F/A-18 Hornets; these are soon to be replaced by Airbus A330 MRTTs. The 707 is also the platform for the United States Air Force (USAF)'s Joint STARS project, and the United States Navy's E-6 Mercury. USAF acquired around 250 used 707s to provide parts for the KC-135E Stratotanker program.[1] This is the major reason so few 707s are in service compared with Douglas DC-8s.

The current list of customer codes used by Boeing to identify specific options and trim specified by customers was started with the 707, and has been maintained through Boeing's current models. Essentially the same system as used on the earlier Boeing 377, the code consisted of two digits affixed to the model number to identify the specific aircraft version. For example, Eastern Airlines was assigned code '25'. Thus a 707-200B sold to Eastern would carry the model number 707-225B. The number remained constant as further Boeings were purchased, thus an Eastern 737-300 would carry the number 737-325.

Trivia
- The 707's name is most commonly spoken as "Seven Oh Seven".
- American actor John Travolta owns, and is qualified to fly, an ex-Qantas 707-138, registration N707JT.
- At Seafair on Aug. 6, 1955, Boeing test pilot Alvin "Tex" Johnston twice performed a "barrel roll" in the Dash-80 at 500 feet. This story appears on a video called 'Frontiers of Flight—The Jet Airliner', produced by the National Air and Space Museum in association with the Smithsonian Institution in 1992. The roll can be viewed on video at AviationExplorer.com. To date Johnston is the only pilot to have performed this in a four engine jet transport. (Other big four engine jet aircraft have done barrel rolls; for instance, the Avro Vulcan XA890 was rolled by Roly Falk on the first day of the 1955 Farnborough Air Show, but it was a subsonic bomber).
- The Boeing 707 was the first commercially successful airplane to use podded engines.
- The Chinese government sponsored development of the Shanghai Y-10 during the 1970s, which was a near carbon-copy of the 707.
- A Boeing 720 was intentionally crashed (flown by remote control) at Edwards AFB as a part of the NASA Controlled Impact Demonstration program.

The keywords generated with no query input are as follows (only the "top 20" keywords are shown, if there are fewer than 20, then only those are shown), with the keyword and its relative importance (weight) shown numerically:

aircraft [1]
boeing [0.97698575258255]
engine [0.849424719810486]
version [0.677796194553375]
model [0.602883517742157]
produce [0.553547620773315]
air [0.545852839946747]
number [0.516338527202606]
roll [0.416423827409744]
flight [0.386013597249985]
wing [0.365959376096725]
order [0.357718467712402]
jet [0.352065712213516]
turbofans [0.332708656787872]
customer [0.322590529918671]
service [0.315239310264587]
airline [0.313950717449188]
build [0.30619865655899]
military [0.297034621238708]
pratt [0.290491014719009]

Using "Boeing" as an input query produces the following keywords (note how different they are from the "no input query" case:

caledonian [1]
early [0.594202935695648]
test [0.543478310108185]
business [0.543478310108185]
custom-built [0.43478262424469]
abandoned [0.43478262424469]
deliver [0.297101467847824]
current [0.26630437374115]
british [0.26630437374115]
airliner [0.21433912217617]
program [0.193840593099594]
answer [0.135869577527046]
quick [0.135869577527046]
merger [0.135869577527046]
registration [0.135869577527046]
pilot [0.135869577527046]
call [0.135869577527046]
show [0.135869577527046]
code [0.119699411094189]
replace [0.0679347887635231]

When "airport" is added to the query, the following keywords result:

international [1]
south [1]
heathrow [1]
civil [0.799999952316284]
prestwick [0.25]
ayrshire [0.25]
london [0.25]
scotland [0.111111104488373]
british [0.111111104488373]
caledonian [0.0625]
show [0.0625]
boac [0.0399999991059303]
boeing [0.0399999991059303]
axrs [0.0399999991059303]
restriction [0.0399999991059303]

When "engine" is added to the query, the following keywords result:

jet [1]
mount [0.704587757587433]
turbofans [0.704587757587433]
whitney [0.396696656942368]
port [0.382928162813187]
qantas [0.382928162813187]
powerful [0.382928162813187]
produce [0.382928162813187]
turbojet [0.382928162813187]
technology [0.382928162813187]
separation [0.382928162813187]
commercial [0.382928162813187]
first-generation [0.306342512369156]
podded [0.306342512369156]
aircraft [0.201751068234444]
suffer [0.191464081406593]
pratt [0.187981382012367]
number [0.110436484217644]
conway [0.0957320407032967]
flap [0.0957320407032967]

With the input "+engine−jet" the following keywords result:

mount [1]
turbofans [1]
technology [0.543478310108185]
powerful [0.543478310108185]
qantas [0.543478310108185]
turbojet [0.543478310108185]
separation [0.543478310108185]
port [0.543478310108185]
podded [0.434782654047012]
first-generation [0.434782654047012]
suffer [0.271739155054092]
number [0.15673916041851]
flap [0.135869577527046]
conway [0.135869577527046]
order [0.135869577527046]
obsolescent [0.108695663511753]
takeoff [0.0603864789009094]
turn [0.0603864789009094]
cargo [0.0603864789009094]
uprated [0.0603864789009094]

With the input "flight" added, the following keywords result:
  training [1]
  commercial [1]
  cargo [1]
  customer [0.25]
  frontier [0.25]
  jet [0.25]
  transcontinental [0.199999988079071]
  loss [0.111111104488373]
  airliner [0.111111104488373]
  call [0.111111104488373]
  separation [0.111111104488373]
  yaw [0.111111104488373]
  york [0.0625]
  produce [0.0625]
  aircraft [0.0625]
  video [0.0625]
  damper [0.0625]
  engine [0.0625]
  life [0.0399999991059303]
  operate [0.0199999995529652]
  suffer [0.0199999995529652]

With the input "produce" the following keywords result (note that there are 28 keywords, to illustrate how those keywords that were less important previously are now more important, and vice versa):
  turbofans [1]
  turbojet [0.594202935695648]
  variant [0.543478310108185]
  engine [0.543478310108185]
  airliner [0.543478310108185]
  efficient [0.43478262424469]
  lbf [0.291386187076569]
  model [0.193840593099594]
  fuel [0.135869577527046]
  jet [0.135869577527046]
  specific [0.135869577527046]
  aircraft [0.135869577527046]
  conway [0.0603864751756191]
  whitney [0.0603864751756191]
  request [0.0603864751756191]
  lbst [0.0603864751756191]
  national [0.0603864751756191]
  royce [0.0339673943817615]
  air [0.0339673943817615]
  upgrade [0.0339673943817615]
  flight [0.0339673943817615]
  military [0.0339673943817615]
  pratt [0.0339673943817615]
  roll [0.0217391308397055]
  kn [0.0217391308397055]
  powerful [0.0217391308397055]
  boac [0.0217391308397055]
  powered [0.0173913054168224]

With the input "+produce−engine" the following keywords result:
  variant [1]
  fuel [0.25]
  specific [0.25]
  request [0.111111104488373]
  lbst [0.111111104488373]
  national [0.111111104488373]
  air [0.0625]
  military [0.0625]
  upgrade [0.0625]
  boac [0.0399999991059303]
  kn [0.0399999991059303]
  powered [0.0320000015199184]

Figure 3:
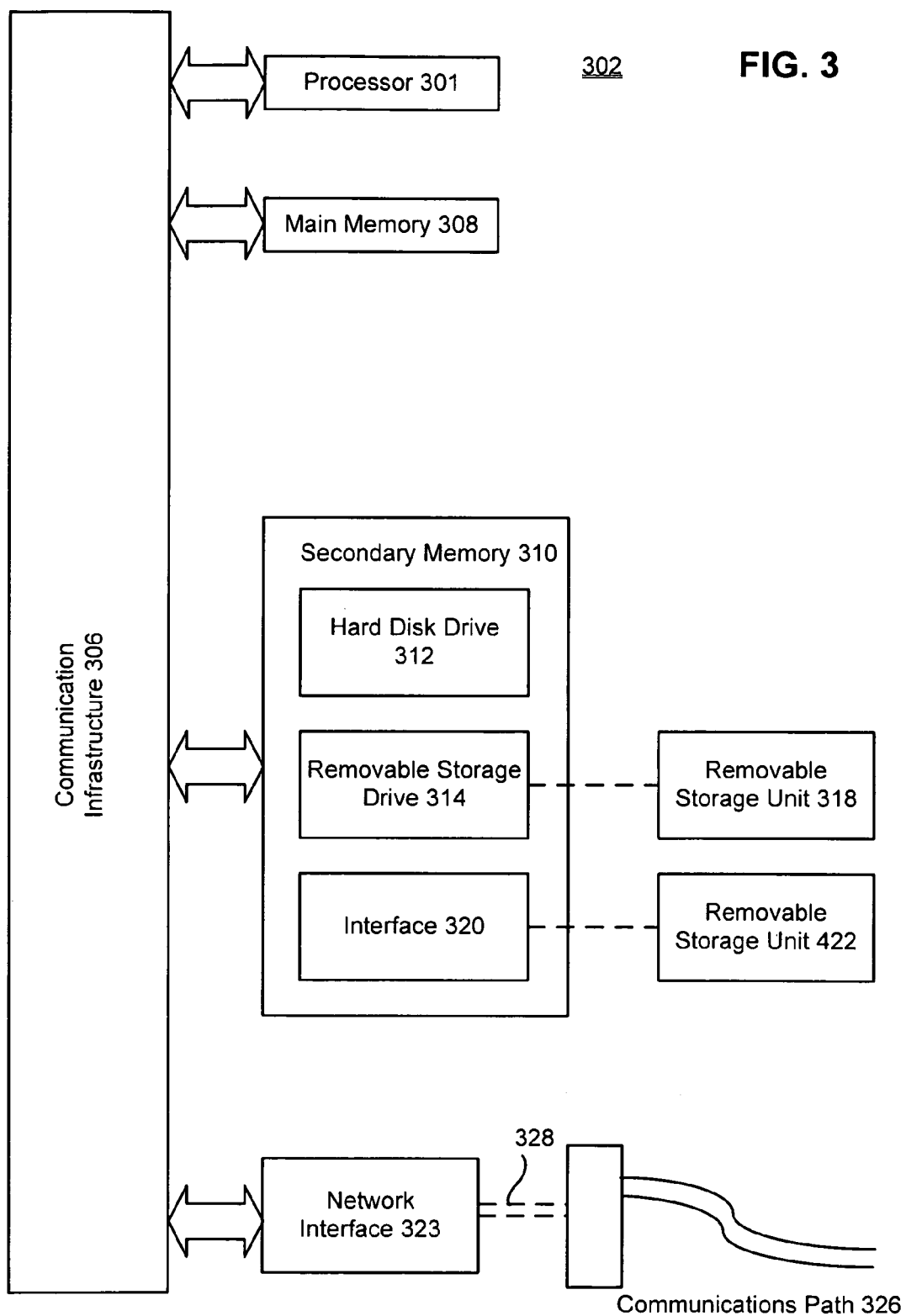
FIG. 3 illustrates an example of a computer system on which the neural network can be implemented.

An example of the computer 302 where the neural network can be implemented is illustrated in FIG. 3. The computer 302 includes one or more processors, such as processor 301. The processor 301 is connected to a communication infrastructure 306, such as a bus or network). Various software implementations are described in terms of this exemplary computer system. After reading this description, it will become apparent to a person skilled in the relevant art how to implement the invention using other computer systems and/or computer architectures.

Computer 302 also includes a main memory 308, preferably random access memory (RAM), and may also include a secondary memory 310. The secondary memory 310 may include, for example, a hard disk drive 312 and/or a removable storage drive 314, representing a magnetic tape drive, an optical disk drive, etc. The removable storage drive 314 reads from and/or writes to a removable storage unit 318 in a well known manner. Removable storage unit 318 represents a magnetic tape, optical disk, or other storage medium that is read by and written to by removable storage drive 314. As will be appreciated, the removable storage unit 318 can include a computer usable storage medium having stored therein computer software and/or data.

In alternative implementations, secondary memory 310 may include other means for allowing computer programs or other instructions to be loaded into computer 302. Such means may include, for example, a removable storage unit 322 and an interface 320. An example of such means may include a removable memory chip (such as an EPROM, or PROM) and associated socket, or other removable storage units 322 and interfaces 320 which allow software and data to be transferred from the removable storage unit 322 to computer 302.

Computer 302 may also include one or more communications interfaces, such as communications interface 324. Communications interface 324 allows software and data to be transferred between computer 302 and external devices. Examples of communications interface 324 may include a modem, a network interface (such as an Ethernet card), a communications port, a PCMCIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, an RF link and other communications channels. In an embodiment of the invention, signals 328 comprise data packets sent to processor 301. Information representing processed packets can also be sent in the form of signals 328 from processor 301 through communications path 326.

The terms "computer program medium" and "computer usable medium" are used to generally refer to media such as removable storage units 318 and 322, a hard disk installed in hard disk drive 312, and signals 328, which provide software to the computer 302.

Computer programs are stored in main memory 308 and/or secondary memory 310. Computer programs may also be received via communications interface 324. Such computer programs, when executed, enable the computer 302 to implement the present invention as discussed herein. In particular, the computer programs, when executed, enable the processor 301 to implement the present invention. Where the invention is implemented using software, the software may be stored in a computer program product and loaded into computer 302 using removable storage drive 314, hard drive 312 or communications interface 324.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for identifying keywords in search results comprising:
    a processor;
    a memory coupled to the processor, wherein the memory includes instructions that when executed by the processor perform operations comprising:
    connecting a plurality of neurons as a bidirectional neural network, the neurons being associated with words and documents, the neurons associated with words forming a first layer, and the neurons associated with documents forming a second layer, each neuron having multiple inputs from other neurons, a single output connecting the neuron to other neurons, and a threshold function at the single output, wherein at least some of the neurons of the first layer have connections between them and represent keywords in the documents;
    displaying to a user, on a display device, words of the search query and additional keywords from the documents and identifying the neurons that correspond to keywords associated with at least one of the documents; and
    changing positions of the keywords on a display relative to each other based on input from the user, wherein the change in position of one keyword changes the position of other displayed keywords.

2. The system of claim 1, wherein the input from the user comprises dragging a keyword on a display device.

3. The system of claim 1, wherein the input from the user comprises changing a relevance of neurons relative to each other.

4. The system of claim 1, wherein the neural network is excited by a query that comprises words selected by a user.

5. The system of claim 1, wherein the neural network is excited by a document selected by a user.

6. The system of claim 1, wherein the keywords are generated based solely on a chosen document.

7. The system of claim 1, wherein the keywords are generated based solely on a plurality of chosen documents.

8. The system of claim 1, wherein the user can inhibit neurons of the neural network by indicating irrelevance of a document.

9. The system of claim 1, wherein the user can inhibit neurons of the neural network by indicating irrelevance of a selected keyword.

10. The system of claim 1, wherein the neural network is excited by a query that identifies a document considered relevant by a user.

11. The system of claim 1, wherein the neural network also includes neurons having a group of words associated with a single neuron.

12. The system of claim 1, wherein the neural network is excited by a query that identifies a plurality of documents considered relevant by a user, and wherein the neural network outputs keywords associated with the plurality of documents.

13. A system for identifying keywords, the system comprising:
    a processor;
    a memory coupled to the processor, wherein the memory includes instructions that when executed by the processor perform operations comprising:
    arranging a plurality of neurons into a bidirectional neural network comprising a plurality of layers, the layers including words and documents, the neurons associated with words forming a first layer, and the neurons associated with documents forming a second layer, each neuron having multiple inputs from other neurons, a single output connecting the neuron to other neurons, and a threshold function at the single output, wherein at least some of the neurons of the first layer have connections between them and represent keywords in the documents;
    wherein the neurons are connected by a plurality of connections, wherein each neuron is connected to only some of the other neurons, such that at least some of the word neurons have connections between them;
    wherein, in response to an input query, the neural network outputs a plurality of keywords associated with documents that are contextually relevant to the input query, and wherein, in response to input from a user, positions of the keywords on a display relative to each other are changed, such that a change in position of one keyword changes the position of other displayed keywords.

14. The system of claim 13, wherein the input query identifies a plurality of documents considered relevant by a user, and wherein relevance of the identified documents is modified in response to user input.

15. The system of claim 13, wherein the processor is further programmed to change positions of the keywords relative to each on a display other based on input from the user, wherein the change in position of one keyword changes the keywords outputted by the neural network.

16. The system of claim 15, wherein the input from the user comprises dragging a keyword on a display device.

17. The system of claim 15, wherein the input from the user comprises changing a relevance of two neurons relative to each other.

18. The system of claim 13, wherein the neural network is excited by a query that comprises words selected by a user.

19. The system of claim 13, wherein the user can inhibit neurons of the neural network by indicating irrelevance of a document.

20. The system of claim 13, wherein the neural network is excited by a query that identifies a document considered relevant by a user.

21. The system of claim 13, wherein the neural network also includes neurons having a group of words associated with a single neuron.

22. The system of claim 13, wherein the neural network is excited by a document selected by a user.

23. A method for identifying keywords comprising:
    arranging, using a processor, a plurality of neurons into a bidirectional neural network comprising a plurality of layers, the layers including words and documents, each neuron having multiple inputs from other neurons, a single output connecting the neuron to other neurons, and a threshold function at the single output,
    forming a first layer of the neural network from the neurons associated with words;

forming a second layer of the neural network from the neurons associated with documents;

forming a plurality of connections between the neurons, wherein each neuron is connected to only some of the other neurons, such that at least some of the word neurons have connections between them, wherein at least some of the neurons of the first layer have connections between them and represent keywords in the documents, and in response to an input query, outputting, to a user, a plurality of keywords associated with the documents; and in response to input from the user, changing positions of the keywords on a display relative to each other, such that a change in position of one keyword changes the position of other displayed keywords.

* * * * *